(12) United States Patent
Mori et al.

(10) Patent No.: US 7,685,034 B1
(45) Date of Patent: Mar. 23, 2010

(54) SYSTEM AND METHOD FOR FINANCE-BASED COMPETITION

(75) Inventors: Kenichi Mori, Carlsbad, CA (US);
David Taylor, San Marcos, CA (US);
Ronald Jason Char, San Diego, CA (US); Brian M. Weaver, Valley Center, CA (US)

(73) Assignee: Intuit Inc., Mountain View, CA (US)

( * ) Notice: Subject to any disclaimer, the term of this patent is extended or adjusted under 35 U.S.C. 154(b) by 90 days.

(21) Appl. No.: 11/870,994

(22) Filed: Oct. 11, 2007

(51) Int. Cl.
*G06F 17/22* (2006.01)
*G06Q 40/00* (2006.01)
*H04K 1/00* (2006.01)

(52) U.S. Cl. .................. 705/31; 705/36 R; 705/36 T
(58) Field of Classification Search .................. 705/36, 705/100
See application file for complete search history.

(56) References Cited

U.S. PATENT DOCUMENTS

| 4,440,397 | A | 4/1984 | Butner |
| 5,261,672 | A | 11/1993 | Jordan |
| 2002/0091608 | A1* | 7/2002 | Odegaard et al. ............. 705/36 |
| 2002/0111888 | A1 | 8/2002 | Stanley |
| 2006/0112114 | A1* | 5/2006 | Yu et al. ..................... 707/100 |

* cited by examiner

*Primary Examiner*—F. Zeender
*Assistant Examiner*—Denisse Ortiz Roman
(74) *Attorney, Agent, or Firm*—Osha • Liang LLP

(57) ABSTRACT

Various embodiments of a system and method for finance-based competition are described. The system and method for finance-based competition may provide a game engine configured to enable a user to engage in a finance-based competition with one or more other users. The winner of the competition may be determined by one of various standards related to various financial attributes. In various embodiments, the game engine may be configured to enable a user to compete against one or more user-defined goals. A user may set various goals that he would like to complete during a given time period, such as saving a certain amount of wealth, funding a child's education fund, purchasing a second home, minimizing taxes owed to a taxing authority, and other finance-related goals. In various embodiments, the game engine may be configured to generate one or more finance-related predictions using a rules engine.

19 Claims, 10 Drawing Sheets maintain a user data set associated with one or more users, the user data set indicating a multiple financial attributes collected from one or more entities
700 receive one or more goal metrics
710 for each goal metric, monitor user performance and determine whether user has met one or more goals corresponding to each goal metric
720

*FIG. 7*

```
┌─────────────────────────────────────┐
│  maintain a user data set associated with one or │
│  more users, the user data set indicating multiple │
│  financial attributes collected from one or more │
│                entities              │
│                  800                 │
└─────────────────────────────────────┘
                    │
┌─────────────────────────────────────┐
│  access a request for a financial prediction │
│  associated with said one or more users, the financial │
│  prediction indicating one or more particular actions │
│                  810                 │
└─────────────────────────────────────┘
                    │
┌─────────────────────────────────────┐
│  determine one or more relevant rules from a plurality │
│  of rules, where each relevant rule corresponds to an │
│        action indicated by the request │
│                  820                 │
└─────────────────────────────────────┘
                    │
┌─────────────────────────────────────┐
│  apply the relevant rules to the actions indicated by │
│  the request and the user's user data set to generate │
│            a financial prediction    │
│                  830                 │
└─────────────────────────────────────┘
```

*FIG. 8*

SYSTEM AND METHOD FOR FINANCE-BASED COMPETITION

BACKGROUND

Tax preparation applications have greatly reduced the difficulty in preparing ones taxes. Tax preparation applications typically present a series of interview screens to a user (e.g., a tax payer or the tax payer's representative) in order to extract information from the user. Such information may typically include information related to the user's identity (e.g., Social Security Number, driver's license number, etc.), financial information (e.g., salary, investments, charitable deductions), and other information that may impact a tax payer's tax return (e.g., number of dependents, home ownership status, etc.). While tax preparation applications are considered by many to be an easier method for preparing a tax return than many alternatives (e.g., using tax worksheets to complete a tax form, such as IRS Form 1040), users may continue to spend a considerable amount of time gathering the correct information and/or data necessary for answering the many questions posed by tax preparation applications.

Additionally, while tax preparation applications can greatly simplify the process of generating a tax return, many users do not find them particularly engaging or entertaining. For instance, many tax preparation applications require a user to perform a series of repetitive tasks (e.g., data entry) until the tax preparation application has acquired the requisite data to complete the generation of a tax return for the user. As such, many users typically engage in tax preparation activities only when required (e.g., shortly before a tax return is due to a taxing authority).

The characteristics described above with respect to tax preparation and tax preparation applications generally apply to financial planning and financial planning applications, as well. For instance, financial planning applications may create a comprehensive snapshot of a user's financial status by presenting a series of interview screens to a user in order to extract financial information from the user. Such information may include information related to income, investments, retirement, education, and other finance-related items. Furthermore, as is the case with tax preparation applications, financial planning applications may in some cases require a series of repetitive tasks (e.g., data entry, online account configurations, etc.). As such, many users may infrequently update their financial snapshot and thus fail to reap the full benefits of financial planning applications.

SUMMARY

Various embodiments of a system and method for finance-based competition are described. The system and method for finance-based competition may provide a game engine configured to enable a user to engage in a finance-based competition with one or more other users. The game engine may manage one or more user data sets that include multiple financial attributes associated with a user. The user data sets may be dynamically updated as new information regarding a user's financial attributes becomes available. In this way, each user data set may provide an up-to-date view of a user's financial state. For a particular user, the game engine may be configured to determine performance associated with one or more financial attributes. The game engine may also be configured to determine results for the competition, which may include determining the relative performance of a particular user with respect to the performance of other users participating in the competition. The relative performance of the particular user may be dependent on both the user's performance and the performance of one or more other user's participating in the competition.

In various embodiments, the game engine may be configured to generate one or more finance-related predictions, which may be based on hypothetical actions proposed by a user. The game engine may utilize a rules engine to determine a predicted outcome, such as how the user may be impacted financially if the user completes the hypothetical actions. In some cases, a user may request a finance-related related prediction from the game engine. The request may include an indication of the hypothetical actions that the user is contemplating. The game engine may be configured to determine, such as through the use of a rules engine, the financial implications of the actions and generate a corresponding financial prediction.

BRIEF DESCRIPTION OF THE DRAWINGS

FIG. 7 illustrates an exemplary method for monitoring user performance with respect to various goal metrics.

FIG. 8 illustrates an exemplary method for applying rules to generate financial predictions.

Figure 1:
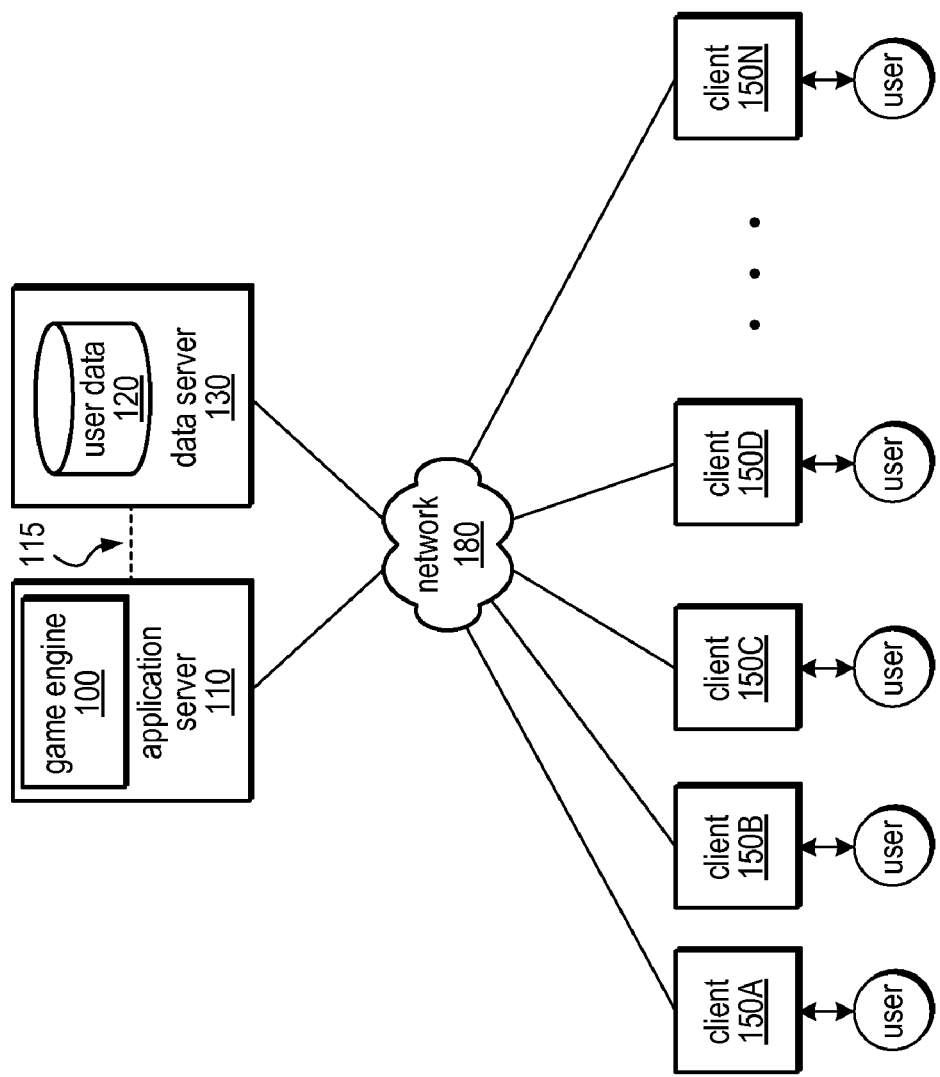
FIG. 1 is a block diagram illustrating an exemplary embodiment of a system configured to implement a finance-based competition.

While the system and method for finance-based competition is described herein by way of example for several embodiments and illustrative drawings, those skilled in the art will recognize that the system and method for finance-based competition is not limited to the embodiments or drawings described. It should be understood, that the drawings and detailed description thereto are not intended to limit embodiments to the particular form disclosed. The intention is to cover all modifications, equivalents and alternatives falling within the spirit and scope of the system and method for finance-based competition as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a system and method for finance-based competition are described. The system and method for finance-based competition may provide a game engine configured to enable a user to engage in a competition with one or more other users. In many cases, the competition may be finance and/or tax related. For instance, in one embodiment, one user may challenge another user to a financial competition. The winner of the competition may be decided by one of various standards described herein (e.g., standards related to savings, investments, and/or taxes). For example, one type of financial competition may determine which user among multiple users accumulates the most amount of wealth during a given time period. In some embodiments, the game engine may be configured to enable a user to compete against one or more user-defined goals. For instance, a user may set various goals that he would like to complete during a given year, such as saving a certain amount of wealth (e.g., cash, equities, real estate, etc.), funding a child's education fund, purchasing a second home, minimizing taxes owed to a taxing authority, and other finance-related goals. In this way, the game engine may create a specific plan or roadmap that includes various finance-related goals or milestones to be completed by the user. In some embodiments, the game engine may be configured to generate one or more finance-related predictions. For example, a user may input one or more "hypothetical" actions (e.g., purchasing a second home, increasing retirement savings, sending a child to a private education institution) and the game engine may utilize a rules engine to determine a predicted outcome, such as how the user may be impacted financially.

In various embodiments, the game engine may maintain one or more user data sets for use in competitions between users, goal-based competitions, as well as financial predictions. For a particular user, this user data set may serve as a "financial genome" that includes various financial attributes associated with the user. The user data sets may in some embodiments be used to model the user in various situations. The user data sets may be generated from data and information from a plurality of sources (e.g., financial institutions, public record databases, economic data) as described herein. The game engine described herein may dynamically update a user data set with new data as such data becomes available. For example, if a user were to buy a second home, the game engine may update the user data set (e.g., by obtaining data from the user's mortgage lender) to reflect such a purchase (e.g., by incorporating the mortgage terms, such as down payment and monthly mortgage payment, into the user data set). In general, each data set may provide a complete (or nearly complete) representation of a user's current financial situation or financial state. In various embodiments, the user data sets may include the requisite information for filing a tax return with a taxing authority. Accordingly, the game engine described herein may be configured to generate a tax return from a user data set and automatically file the tax return on the user's behalf.

In any of the various embodiments described herein, the game engine may maintain "virtual users". In other words, the game engine may maintain user specific data (including user data sets as described above) for one or more users that do not actually exist. These virtual users may serve as competition for one or more real world users. In various embodiments, different types of virtual users may be created (e.g., by a user or by the game engine). For instance, a "fiscally conservative" virtual user may exhibit particular attributes (which may be defined by a user data set), such as a propensity to save large amounts of cash and invest in government bonds. Conversely, a "fiscally irresponsible" virtual user may choose to invest in high-risk equities and devote a large amount of his salary to depreciating assets (e.g., automobiles, electronics, etc.).

FIG. 1 illustrates an exemplary system including game engine 100, which may enable multiple users to participate in a financial competition. Users may access and/or interact with game engine 100 through one or more client systems, such as clients 150A-150N (which may be collectively referred to herein as clients 150). In various descriptions herein, features or functionality may be described with respect to client 150A; however, such descriptions may in various embodiments apply to any particular one of clients 150. Each of clients 150 may be a variety of computer systems, such as a desktop computer system, laptop or notebook computer system, handheld device, mobile phone or other communication device, as well as a variety of other devices configured to execute computer instructions. Each of clients 150 may be configured to execute a variety of software applications, such as applications configured to enable communication between one of clients 150 and game engine 100, as described in more detail with respect to later figures. Please note that, with respect to clients 150, the term "client" is used in regard to the transfer of data from servers 110 (including game engine 100) and server 130. However, in various embodiments, clients 150 and servers 110 may not necessarily adhere to a traditional client-server architecture. Indeed, in various embodiments, other architectures, such a peer-to-peer architectures, may be employed.

Clients 150 may access servers 110 and 130 (and vice-versa) through network 180 which may be a Wide Area Network (WAN) (e.g., the Internet), a Local Area Network (LAN) (e.g., a corporate or Ethernet network), some other type of network configured to support communications between computer systems, and/or any combination thereof. In one embodiment, network 180 may represent the Internet and the elements of FIG. 1 may communicate to each other through one or more web-based services.

Application server 110 may host one or more applications and/or components, such as game engine 100. Game engine 100 may be configured to enable a particular user (e.g., the user of client 150A) to participate in a financial competition with one or more other users (e.g., the users of clients 150B-150D). As described in more detail below, game engine 100 may maintain one or more user data sets for each user participating in a competition. Each user data set may contain financial attributes associated with the user's current financial state. Note that in various embodiments other data sets may be used in lieu of or in addition to the aforementioned user data sets. For instance, game engine 100 may maintain user data sets associated with a user's past financial state, future (or predicted) financial state, and/or some combination thereof.

Game engine 100 may access user data, such as user data sets (or data used to generate user data sets), from data server 130. Data server 130 may store user data 120, which indicates various financial attributes for one or more users. For example, for a particular user, user data 120 may store data that indicates information about the user's salary, investment income, retirement portfolio, and/or tax characteristics (e.g., number of dependents, deductions, and other tax information). In various embodiments, game engine 100 may access user data from data server 130 over network 180 or another network configured to transfer data between computer systems. As illustrated by coupling 115, application server 110 and game engine 100 may in some cases communicate via a communication channel that is separate from network 180, such as a local LAN. While application server 110 and data server 130 are illustrated as separate elements in FIG. 1, the functionality of each server may in some embodiments be combined into one computer system. In other cases, the functionality of either server may be implemented in a distributed manner, such as through the use of multiple computer systems to implement the functionality of each server.

Figure 2:
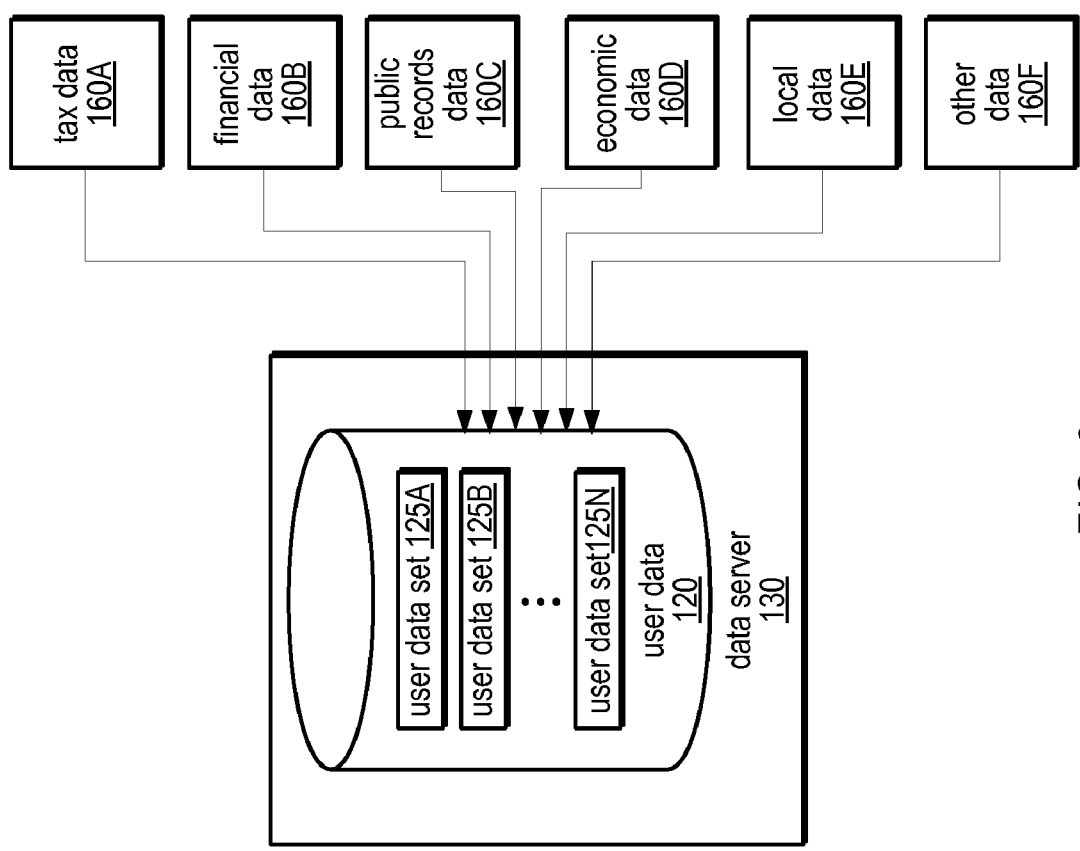
FIG. 2 illustrates an exemplary block and data flow diagram including a data server and various types of data collected to generate a user data set.

As described above, game engine 100 may access user data from data server 130. The user data may include various types of data accessed from various entities. FIG. 2 illustrates the types of data that may be accessed and/or managed by data server 130, according to some embodiments. The user data managed by data server 130 may be stored in one or more user data sets, such as user data sets 125A-125N (which may be collectively referred to herein as user data sets 125). In various embodiments, each user data set may be associated with a particular user (e.g., a single individual with no dependents) or multiple users (e.g., a married couple with two children). In some cases, each user data set may be associated with a participant in a competition supported by game engine 100. Game engine 100 may utilize user data sets 125 in order to implement a competition, and/or generate predictions as described in more detail herein.

As illustrated by the various types of data 160A-160F (which may be collectively referred to herein as data 160), data server 130 may in some embodiments collect data from one or more entities (not illustrated). Such entities may include financial institutions (e.g., banks, brokerages, credit unions, etc.), individuals (e.g., the users illustrated in FIG. 1), public databases (e.g., information accessible via the Internet or government databases) and other entities as described in more detail below.

As illustrated by tax data 160A, data server 130 may access tax data from one or more entities. Data server 130 may access tax data directly from a user, such as one or more of the users illustrated in FIG. 1. For instance, the user may submit tax based information directly to data server 130, such as through a user-interface provided by the data server (e.g., a web page or web based application configured to present one or more tax based questions to the user). In various embodiments, users may utilize their respective client to submit tax data to data server 130. For instance, clients (e.g., such as clients 150 of FIG. 1) may be equipped with one or more tax preparation applications. In many cases, these tax preparation applications may have application data stored on the client computer system. The application data may include user-provided responses to tax based question posed to the user by the tax preparation application. The application data may also include data derived from the user responses (e.g., Adjusted Gross Income, amount of a tax refund, or another portion of data calculated or derived from user input). The application data may also include a completed (or partially completed) electronic tax return. Any of above described elements of tax preparation application data may be transmitted from a client computer to data server 130. In some cases, this transfer may be automatically scheduled by a scheduler on the client computer, the data server, and/or the game engine.

In some embodiments, data server 130 may obtain tax data from an electronic filing system or database associated with an electronic filing system. Electronic filing systems are typically configured to access a tax return (e.g., a tax return prepared by a tax preparation on a client computer or a network or web-based tax preparation application) and electronically file the tax return while adhering to a protocol or standard for submission of a tax return to a taxing authority. Accordingly, electronic filing systems may contain (or have access to) a plethora of tax data for a given user. This tax data may be accessible to data server 130, such as through a network- or web-based interface.

As illustrated by financial data 160B, data server 130 may be configured to access financial data from various entities. Similar to tax data 160A, financial data 160B may be accessed from a user utilizing a client computer system, such as the users illustrated in FIG. 1. In various embodiments, a client computer system may include a financial planning application configured to extract information from a user by posing one or more finance-related questions to the user (e.g., questions related to salary, savings, investments etc.). In other cases, data may be entered directly into the financial planning application (e.g., the user may manually add information about a loan or a checking or savings account). In other cases, the financial planning application may be network- or web-based. Accordingly, the data server may be configured to access financial data for one or more users from such network- or web-based systems (e.g., through a web-based service). In various embodiments, data server 130 may access financial data from one or more financial institutions, such as banks, brokerages or investment firms, and/or other finance related entities.

As illustrated by public records data 160C, data server 130 may be configured to access public records data associated with one or more users. Public records data may in some cases include data provided by one or more government agencies (e.g., federal, state or local government agencies). For instance, one type of public record data may include property appraisal information. Other types of public records data, such as census or demographic data may also be access by data server 130. For instance, in various embodiments, data server 130 may determine the population present within an area bounded by a particular zip code as well as crime rates and other statistics.

The data server may also access economic data from one or more entities, as illustrated by economic data 160D. Economic data 160D may include information regarding various economic indicators, which may in some cases enable rules engine 100 to determine more accurate predictions about the economy and its impact on a user's financial status. Such economic indicators may include, but are not limited to, real Gross Domestic Product (GDP), Consumer Price Index (CPI), non-farm payroll employment, housing starts, industrial production/capacity utilization, retails sales, business sales and inventories, advance durable goods shipments, new orders for durable goods, unfilled orders for durable goods, vehicle sales (e.g., lightweight vehicle sales), bond yields (e.g., yield on 10-year United States Treasury Bond), market indices (e.g., Standard & Poors 500 Index), and/or a measure of the money supply (e.g., M2), each of which will be understood by one skilled in the art. Data server 130 may access economic data from various resources, such as government agencies (e.g., Bureau of Labor Statistics), as well as private entities (e.g., one or more economic research entities). In any case, data server 130 may access such data via one or more network or web services.

In addition to economic data, the data server may be configured to access local data, as illustrated by local data 160E. Such local data may include local prices for commonly purchased goods and/or services. For instance, local data 160E may indicate local price information for fuel, groceries as well as housing and other items. Other local data may include local tax information, such as information about local property taxes. In various embodiments, the local data may be specific to a particular user. For instance, for a user located in a particular zip code, the data server may extract local data for that particular zip code and store it in the user's corresponding data set. In some cases, the economic data may be provided and/or updated by the user (e.g., a user of FIG. 1) through a client computer system (e.g., client computers 150). For instance, such data may be submitted through a network or web-based service that is provided by the data server. In various embodiments, various other data that may impact a user's financial state may also be accessed, such as other data 160F.

In various embodiments, any of the aforementioned data types may be used to generate a user data set 125. Accordingly, a user data set may include data that is specific to the particular user (e.g., tax data and/or financial data) as well as specific to the user's environment (e.g., public records data, economic data, local data, and other data). Since a user data set may represent a user's current financial state, changes and/or updates in each type of data may result in a corresponding change to the user's current financial state.

Figure 3:
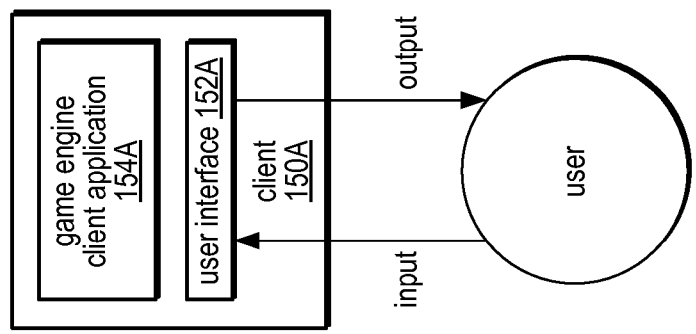
FIG. 3 illustrates an exemplary block and data flow diagram including a client computer system.

FIG. 3 illustrates a more detailed view of client 150A, although the following description may in some embodiments apply to any and/or all of clients 150. In the illustrated embodiment, a user may provide input to and receive output from client computer 150A through a user-interface component, such as user interface 152A. For instance, input may be supplied by various input devices, such as a pointing device (e.g., a mouse or stylus), a keyboard, or other device such as a microphone. Output may be provided to the user, such as through a display (e.g., display of a computer monitor) or sound device (e.g., one or more speakers). User interface 152A may enable a user to interact with game engine client application 154A and in turn game engine 100. In general, game engine client application 154A enables the user to realize the functionality of game engine 100 on client computer 150A. To do so, game engine client application 154A may communicate to the game engine over one or more networks, such as network 180.

Game engine client application 154A may include various functionalities for communicating and interacting with game engine 100. In some embodiments, game engine client application 154A may be a "thin client" (or "lean client") that relies primarily on the functionality of game engine 100 of the application server. For instance, in one embodiment game engine client application 154A may be an application that primarily forwards information from the user to the game engine and vice-versa. In one embodiment, game engine client application 154A may be a web browser or other application configured to display web content, such as Microsoft Internet Explorer™, Netscape Navigator™, Mozilla Firefox™, or any application that is capable of accessing and displaying documents or web pages, such as according to the Hypertext Transport Protocol (HTTP). In this embodiment, game engine 100 may be implemented as a web application accessible to the web browser over network 180. In other embodiments, game engine client application 154A may be a thick client that implements a large portion of the functionality of game engine 100 on the client computer system. Please note, the functionality described herein with respect to game engine client application may also (or alternatively) be implemented by game engine 100. Likewise, the functionality described herein with respect to game engine 100 may also (or alternatively) be implemented by game engine client application 154A.

Figure 4:
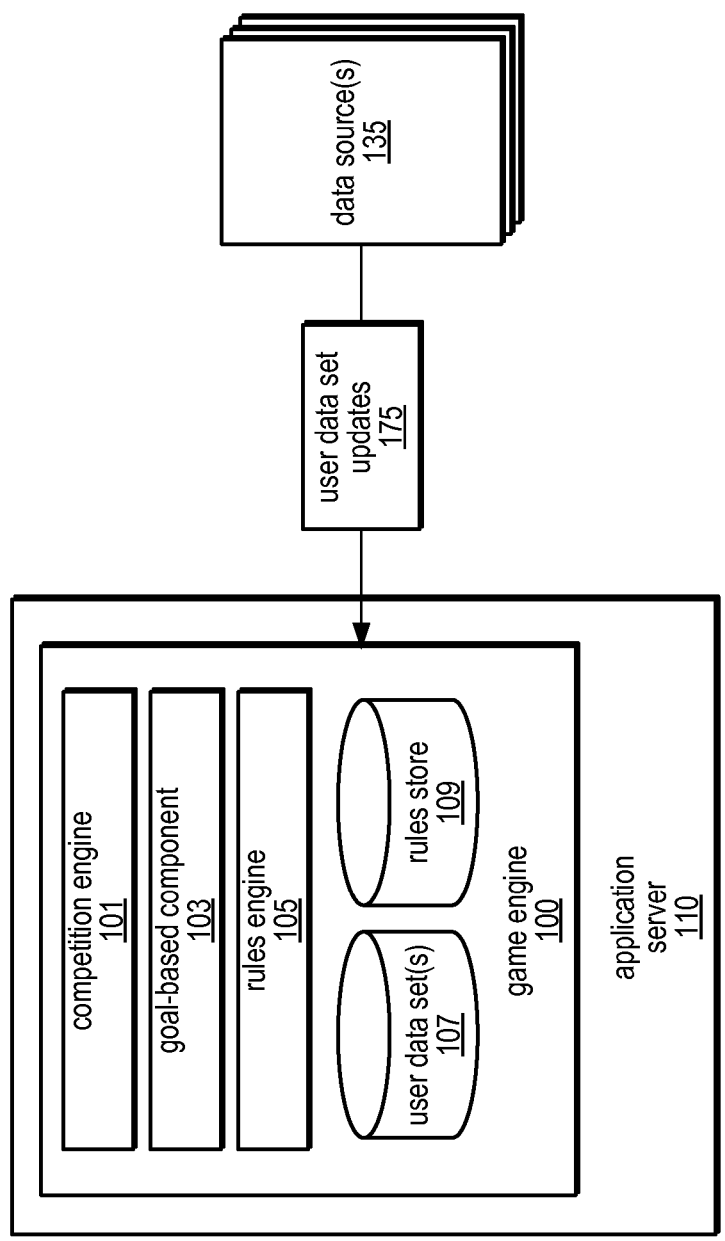
FIG. 4 illustrates an exemplary block and data flow diagram including a game engine and multiple data sources.

A more detailed view of application server 110 according to one embodiment is presented in FIG. 4. In the illustrated embodiment, game engine 100 may manage one or more user data sets 107. These user data sets may in some embodiments correspond to user data sets 125 of FIG. 2. In some cases, user data sets 107 may be the same as user data sets 125. However, in other cases, user data sets 107 may be, to some extent, different than user data sets 125. For instance, game engine 100 may modify user data sets 125 and/or derive additional data from the data sets to generate one or more portions of user data sets 107. In various embodiments, each user data set of user data sets 107 may be associated with one (e.g., a single individual) or more (e.g., a married couple with one or more children) users.

Game engine 100 may dynamically update user data sets when new user data becomes available, as illustrated by data source 135 and user data set updates 175. In one embodiment, game engine 100 may poll one or more data sources, such as data sources 135, to determine if new user data is available. Such data sources may include, but are not limited to, the user, a network-based service associated with the user, client computer systems and/or any entity configured to provide data 160 illustrated in FIG. 2.

To poll a user, the game engine may be configured to send an electronic mail ("email") or other electronic communication to the user. In some cases, this communication may be a reminder, such as a reminder that instructs the user to update an online profile (e.g., the data set). In this way, the user may manually update their data set managed by the game engine.

In various embodiments, one or more network-based services, such as network-based services accessible through network 180, may provide data that may be more recent (and/or more accurate) than data of user data sets 107. Accordingly, game engine 100 may poll such a network-based service, which may be represented by data source 125, for updates to user data sets 107, such as user data set updates 175. For instance, in some embodiments, a user may manage their personal finances through a network-based service such as a web-based financial planning application. The web-based financial planning application may utilize application data that includes various financial attributes about the particular user. For instance, a web-based financial planning application may manage information including, but not limited to, a user's income, investments, retirement accounts, education funds, and other finance related items. As this data may be constantly and/or periodically updated (e.g., through the user's normal use of the financial planning application), it may serve as a good source for dynamic updates to user data sets 107. For instance, the web-based financial planning application may indicate information about a user's bank account such as available balance, posted balance, and/or recent transactions. If the game engine has been given the appropriate permissions by the user, the web-based financial planning application (or an associated web-based update service) may provide the game engine with continual and/or periodic updates to its user data. Game engine 100 may also commit these updates to user data sets 107. In this way, game engine 100 may have access to an up-to-date view of a particular user's financial attributes. While the example of a financial planning application is provided above, other network or web-based applications, such as a web-based tax preparation application, may also provide updates to game engine 100.

In various embodiments, a client computer, such as one of client computers 150, may be configured to provide user data set updates to game engine 100. For instance, in some cases, client computers may include one or more finance-related applications such as financial planning applications and/or tax preparation applications. The particular application may manage application data that contains financial attributes about a user stored on the client computer system. As these applications are utilized, one or more updates or changes to a user's financial attributes may be reflected in the application data. In some cases, such as when the application data includes financial attributes associated with the user that are more recent than financial attributes reflected within user data sets 107, the client computer system may provide user data set updates to the game engine.

In various embodiments, game engine 100 may update user data sets 107 with data from financial institutions (e.g., banks, brokerages, credit unions, etc.), individuals (e.g., the users illustrated in FIG. 1), public databases (e.g., information accessible via the Internet or government databases) and/or other entities as described above in regard to FIG. 2. For instance, game engine 100 may update a user data set 107 with public records data, economic data, and/or local data.

While the various descriptions above demonstrate the game engine polling data sources for updates to user data 107, any suitable method for obtaining the user data set updates may be employed. For instance, in some embodiments, the transfer of user data set updates may adhere to a schedule, such as a schedule determined by an administrator of game engine 100 or the particular data source. In other embodiments, data sources may provide one or more data stores or databases that are directly accessible (through the appropriate protocols) to game engine 100.

Game engine 100 may include a competition engine 101, which may enable one or more users to compete against one or more other users in a financial competition. In various embodiments, for each user participating in a competition (e.g., the users illustrated in FIG. 1), the game engine may maintain a corresponding user data set in user data sets 107. The game engine may use this data set as its representation of the corresponding user. In this way, each user may have a corresponding "virtual representation," which may be defined by the collection of financial attributes indicated by the user's user data set. The user's virtual representation may change dynamically as one or more user data set updates are accessed by the game engine. Additionally, the visibility of the user's virtual representation may be controlled by one or more permission settings. For instance, a user may designate family and friends as user's permitted to view the virtual representation while unauthorized users are barred from viewing the virtual representation.

In one embodiment, one or more of the user's participating in a competition may define terms for the competition as well as provide these terms to game engine 100. The terms of the competition may be referred to herein in as a "competition metric." In some cases, the competition metric may indicate the relevant attributes of a user's data set that will be evaluated during the competition. For instance, two users may participate in a competition to determine who saved the most amount of income during a given time period. Accordingly, the competition metric may indicate that an attribute associated with the user's amount of saved income should be evaluated for the competition. The competition metric may also indicate items that are not necessarily a user attribute of a user data set. For instance, in the aforementioned exemplary competition, the competition metric may also indicate a start and stop date and/or time for the competition.

Competition engine 101 may be configured to determine a user's performance on a continual, periodic, aperiodic, or scheduled basis. For a given competition, a user's performance may be based on how well he is performing with respect to the attributes indicated by the competition metric. For instance, if the competition metric indicates that a competition is based on investment returns, the game engine may determine the user's performance with respect to his investment returns as indicated by the user's user data set, which, as noted above, may be continually updated with new data. In various embodiments, the user's performance may be represented by a quantitative value, such as a number between 1 and 100 or a percentage value. In other cases, the user's performance may be represented by a qualitative value, such as "excellent," "acceptable," or "poor." In some cases, a user's performance may be determined by applying one or more rules, such as rules of rules store 109, to a particular user data set. For instance, rules store 109 may contain one or more rules that, when applied to a user data set, may determine a performance value for a user. For instance, in one embodiment, a "strength of portfolio" rule may be applied to a user data set (e.g., one or more attributes of the user data set that indicate portfolio constituents, such as stocks, bonds, funds, etc.) to determine a rating indicating the performance of a user's portfolio.

As a competition progresses, the competition engine may be configured to provide notifications (e.g., via email, text message, voicemail) to one or more user's participating in a competition. For instance, the competition engine may notify a user that they are currently in the lead or that they are underperforming. In some cases, the notification may be interactive such that a decision may be proposed to the user by the game engine. For instance, competition engine 101 may detect that a user's opponent (e.g., another user participating in the competition) performed an action that increased their performance. For instance, the opponent may have switched insurance carriers to save a significant amount money per month. The competition engine may detect the opponent's monthly savings and provide a corresponding notification to the user. The notification may also ask the user if they would like to make a similar "move." In other words, the game engine may ask the user if they would like to perform an action (e.g., switching insurance carriers) that is similar to the action performed by their opponent. Likewise, the competition may detect actions or moves that have had a negative impact on a user's opponent. Accordingly, the competition engine may suggest the user avoid making a similar move. While the exemplary suggestion presented above relates to savings, the competition engine may provide suggestions for various other topics including, but not limited to, investments (e.g., equities and bonds), loans (e.g., mortgages or automobile loans), credit (e.g., consolidating credit card debt), tax implications (e.g., holding on to an investment longer in order to pay a smaller capital gains tax), and other finance related items.

In some embodiments, a user may not necessarily compete against other users and instead may compete against self-defined goals. Goal-based component 103 may enable a user to specify one or more financial goals (or choose from a list of preconfigured goals) and compete against the specified financial goals. For instance, a user may access game engine 100 from one of client computers 125 (e.g., through a game configuration web page or other similar interface) and specify one or more goals including, but not limited to, a savings goal (e.g., the user saving a certain amount of wealth during a particular time period), an investment goal (e.g., the user achieving a certain rate of return for a particular investment or portfolio), an education goal (e.g., the user funding a child's education fund with a certain amount of funds), a recreation goal (e.g., setting aside a certain amount of funds to purchase non-essential items, such as a family vacation), and other financial goals that may be specified by the user.

As new user data set updates become available and as the user's user data set is updated by the game engine to reflect such data, the user's virtual representation may change. Accordingly, the goal-based component may determine the user's performance with respect to meeting their specified goals (e.g., by evaluating the relevant attributes of the user's user data set) and provide this information to the user. For instance, in one embodiment, the goal-based component may generate a "road map" display that graphically indicates the user's goals in a sequential or timeline form. In this way, the user may easily view the goals they have completed as well as the goals they have yet to complete.

In some embodiments, the goal-based component may be configured to provide the user with one or more suggestions for improving their performance. For instance, goal based component 103 may be configured to determine a trend from multiple (or all) of user data sets 107. For instance, if one of the user's goals is to save a certain amount of money for a family vacation, the goal based component may evaluate user data sets 107 to evaluate user data sets associated with user's that have previously completed the same (or similar) goal. In this example, the goal-based component detecting a trend may include the goal based component detecting that a higher percentage of users that adhered to a monthly savings plan achieved their savings goal than those users not adhering to a monthly savings plan. Accordingly, the goal-based component may suggest such a monthly savings plan to the user. In some cases, if the user desires to follow the goal-based component's suggestion(s), the goal-based component may be configured to automatically implement the suggestion. For instance, in the monthly savings plan example, the goal-based component may automatically communicate with the user's bank and set up a monthly transfer of funds from a checking account to a savings account.

In various embodiments, game engine 100 may be configured generate a financial plan for the user. As demonstrated above, the game engine may be configured to receive one or more financial goals, such as user-defined goals. Game engine 100 may use the user's goals to create a financial plan tailored to the user by analyzing the user's current financial state and determining a financial plan based on the user's goals and financial state. For instance, if the user indicates that one of his goals is to retire by the age of 60, the game engine may analyze the user's current financial state by assessing his associated data set and determining one or more actions (e.g., saving more money, investing in a particular mutual fund, paying off a mortgage, and/or other personal finance related actions) that the user should take in order to reach his goals. In various embodiments, the game engine may be configured dynamically update the user's financial plan as the user's financial state changes (e.g., as indicated by one or more user data set updates). For instance, in the retirement example above, if the user were to inherit a large some of money, the game engine may change the user's financial plan such that the financial plan indicates the user may save less money and still reach his retirement goal.

Another aspect of game engine 100 may include the capability to make forecasts or make predictions associated with a hypothetical action, which may in some cases be an action that a user is contemplating but not yet performed. Rules engine 105 may be configured to forecast or predict how certain actions (or "moves") may affect a user's financial state (as indicated by their user data set). Rules engine 105 may maintain and/or manage one or more rules of rules store 109, each of which may contain an indication of an action and an associated change or outcome. In various embodiments, these rules may be applied to a hypothetical action and a user's user data set to determine a predicted outcome that indicates how the hypothetical action would likely affect the user's financial state. For instance, in one embodiment, a user may indicate that they are contemplating a hypothetical action such as taking out a home equity loan to consolidate credit card debt. In this example, rules engine 105 may apply rules from rules store 109 (e.g., rules associated with loans and/or credit card debt) to the user's data set and the hypothetical action. The result of applying the rules may indicate, for example, that the user could significantly reduce their monthly interest payments by performing such an action. While the aforementioned example relates to loans and credit cards, the rules engine (as well as the rules of rules store 109) may be applicable to a variety of hypothetical actions, such as hypothetical actions associated with various finance topics including, but not limited to, investments, purchases, spending habits, taxes, and other finance related issues. In some embodiments, rules store 109 may include one or more rules that are specific to hypothetical actions that may be performed during different time periods. For instance, different actions may have different financial outcomes since in some cases the timing of an action can affect its outcome (e.g., tax implications associated with short-term vs. long-term capital gains).

In various embodiments, rules engine may utilize heuristics to dynamically update rules store 109 and/or modify rules of rules store 109 based on past user performance to improve performance of the rules (e.g., how well the rules can ascertain accurate predictions or forecasts based on hypothetical actions and a user's user data set). In some cases, these rule modifications may be based on the financial implications of performed user actions. Consider the aforementioned example of a user considering taking out a home equity loan to consolidate credit card debt. While in theory it may be possible to significantly reduce monthly finance charges, the rules engine may determine that in actuality (e.g., by evaluating user data sets and or a history of user data sets that indicates previous actions and their implications on user data sets) an overwhelming percentage of users that have previously performed such action (e.g., consolidating credit card debt with a home equity loan) ultimately spend more money in monthly finance charges due to acquiring additional credit card debt subsequent to the consolidation. Accordingly, rules engine 105 may update one or more rules of rules store so that the rules may take this user tendency (e.g., acquiring additional credit card debt) into consideration when supplying predictions or forecasts to a user. Rules engine 105 may perform such an update for a variety of other types of hypothetical actions such as hypothetical actions associated with various finance topics including, but not limited to, investments, purchases, spending habits, taxes, and other finance related issues. In this way, game engine 100 may exhibit a "learning effect" as the rules engine dynamically updates rule store 109 with more accurate rules based on user data sets 107.

In various embodiments, the game engine may be configured to use trends detected within user data sets to generate one or more rules for making recommendations to users. For instance, in one example, the rules engine may determine that 97% of users that use an automatic savings plan (e.g., a savings plan that includes automatic withdrawals from a checking account and corresponding deposits into a savings account) save more money per year than users that have no scheduled savings plan. In this example, the game engine may generate one or more recommendations to a user that is not currently participating in an automatic savings plan. For instance, the game engine may prompt the user to participate in an automatic savings plan provided by the user's bank in an effort to enable the user to save more money per year. In various embodiments, these recommendations may be based on one or more user-defined goals. In other words, the recommendation may be based on what the user has specified is important to them.

In some embodiments, recommendations generated by the game engine may also be based on one or more lifestyle models. For instance, the game engine may use location based lifestyle models that are dependent on a user's location in order to gain insight into the user's needs, goals, and/or spending habits. Accordingly, in some cases, instead of the user explicitly stating their goals or needs, they may instead provide other information (e.g., their home address) and the game engine may utilize one or more lifestyle models to determine goals for the user.

In various embodiments, the user data sets may include the requisite information for filing a tax return with a taxing authority (e.g., salary, income, capital gains, information relating to dependents, and other tax related items). Accordingly, the game engine described herein may be configured to generate a tax return from a user data set and automatically file the tax return on the user's behalf. In this way, utilizing one or more features of the game engine (e.g., competitions, predictions, etc.) may remove the need for the user to participate in an entirely separate tax return preparation process. In some cases, the generation and filing of a tax return may serve as a synchronization point for the user's data set. For instance, if one or more portions of the user data set are incorrect or do not contain the most recent information, the user may be required to rectify such problems before a tax return is generated and filed with a taxing authority. In various embodiments, as the user's financial state changes (e.g., as indicated by one or more user data set updates), the game engine may be configured to dynamically update a tax return for the user. For instance, as the user receives income over time (e.g., from bi-monthly paychecks, interest earnings, or other sources of income), the game engine may be configured to update corresponding fields of the user's tax return. In this way, the user may at any given time have an up-to-date tax return that may be filed with a taxing authority.

In various embodiments, the game engine described herein may be used to provide training to one or more customer service representatives. For instance, in some cases customer service representatives may be required to understand tax situations or financial situations to effectively assist users seeking customer service help. Since some customer service representatives may not have personal experience with one or more particular tax or financial situation that a user may be experience, the game engine described herein could be used to simulate such situations for the customer service representative. In this way, the customer service representative may gain insight into the particular problems experienced by users without being required to actually experience those problems.

In various embodiments, the game engine may be configured to provide one or more targeted advertisements to users. In some cases, this feature may be dependent on whether the user has authorized such advertisements. To provide such advertisements, the game engine may be configured to determine one or more advertisements or product recommendations based on a users user data set. For instance, the game engine could recommend mortgage refinancing to a user that has a mortgage interest rate that is higher than present rates. In one or more embodiments, the game engine may include one or more third party interfaces that enable a third party to provide such targeted advertisements or product recommendations to users. For instance, one or more investment brokerages could provide investment recommendations to users based on the user's current portfolio performance and financial situation.

In various embodiments, one or more third party developers may leverage the user data sets described herein to generate (e.g., through additional software development) additional game engine features (e.g., separate add-ons or expansion packs). For instance, one or more third party developers may generate a "small business version" of the game engine, which may be tailored to suit the specific needs of small businesses instead of individuals or families. In some cases, one or more software development kits may be generated to facilitate the creation of such additional game engine features.

Figure 5:
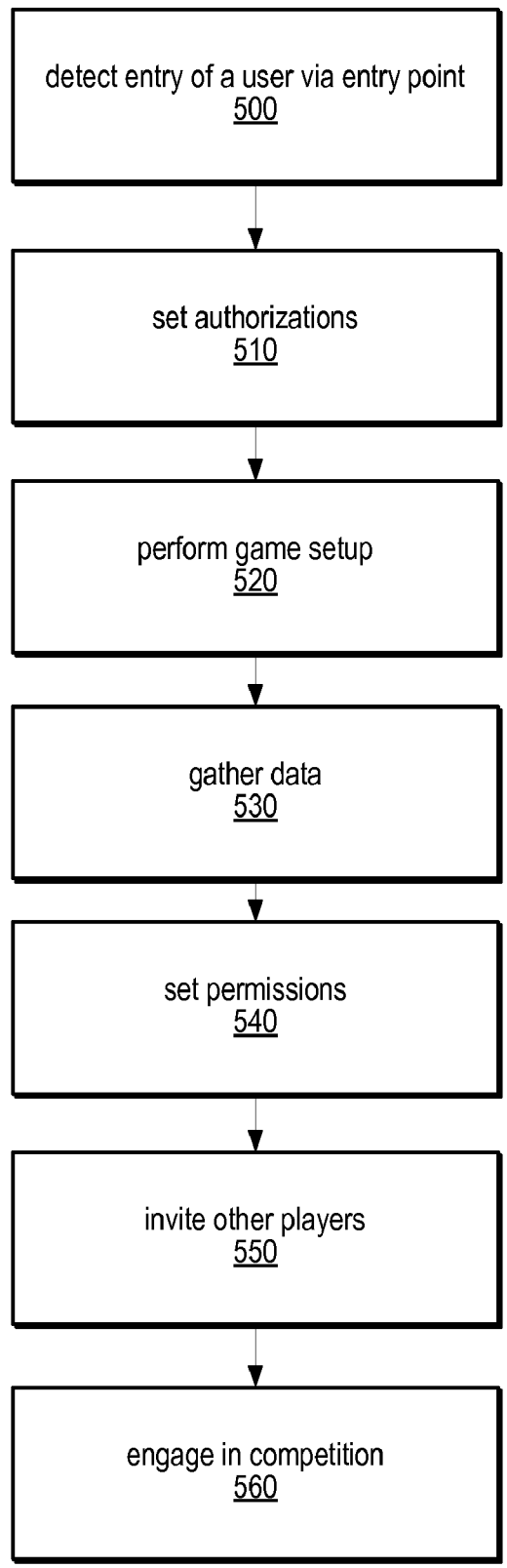
FIG. 5 illustrates an exemplary method for preparing a game engine for finance-based competition.

FIG. 5 illustrates an exemplary method for preparing an instance of the game engine for use by a particular user. For purposes of the description of FIG. 5, the user that is configuring a game engine is referred to herein as the "new user." As illustrated by block 500, the method may include the new user beginning set up of the game engine by beginning at an entry point. An entry point may take on various forms. In one embodiment, an entry point may be an invitation from another user to participate in a competition. For instance, the new user may receive an email (or other electronic communication, such as a text or voice message) that includes an access point such as a hyperlink to a network based game engine. In other cases, the entry point may be inserted into a finance related application, such as in the form of a suggested product advertisement. For instance, as a user is using a tax preparation application or a financial planning application, a message (e.g., a pop-up display) may inform the user of a new product (e.g., game engine 100) that they may like to try. Accordingly, the game engine described herein may be configured to detect entry of a user through any of the aforementioned methods.

Subsequently, the game engine may prompt the user to set various authorization levels for use of the game engine. In one embodiment, the game engine may prompt the user to agree to one or more sets of terms and conditions, which indicate that a user agrees to share personal data with game engine 100. In many cases, the terms and conditions may specify that the data will be anonymized such that it does not contain personal information that identifies the user. In some cases, the personal data shared may be used to assist the learning capabilities of game engine 100. As described above, the user engine may exhibit learning capabilities by analyzing a user's actions and the corresponding impact on the user financial state (as indicated by their user data set) and updating or modifying rules, such as rules 109. It is this data (e.g., the data indicating actions and corresponding outcomes) that may be authorized for use by game engine 100 in step 510. When the new user authorizes their data (and in effect "opts in" to the services provided by the game engine), the data may be considered community data such that when another user is utilizing game engine 100 (e.g., for a competition or a prediction), the game engine 100 may leverage this data for various reasons (e.g., comparisons, predictions, etc.).

After receiving the appropriate authorizations in step 510, the game engine 100 may enter a game setup mode to receive and set various options for use by the game engine as indicated by block 520. In some embodiments, this mode may be implemented in an interview-based manner. For instance, a series of displays including various questions may be presented to the new user and corresponding responses may be received from the new user. In this step, the game engine may receive a variety of personal information from the new user (e.g., name, date of birth, identification numbers, address information, contact information, place of employment, spouse's name, dependents' names, etc). Other information may include data accessibility information (e.g., usernames, passwords, network configurations, pathnames, etc.) for a plurality of entities, such as financial institutions (e.g., banks, brokerages, credit unions, etc.), public databases, client applications (e.g., a pathname or network location of a tax preparation application or financial planning application configured to provide application data to the game engine), and any other of the data sources described above with respect to FIG. 2.

The information obtained during game setup may also be used by the game engine to access additional data about the new user, as illustrated by block 530. For instance, if a user provides the game engine with a zip code or address, the game engine may retrieve local data (e.g., local data 160E) that is relevant to the user, such as local fuel prices, local property taxes, local crime rates, and other statistics that may impact a user's financial state. In another example, the game engine may use an online banking username and password combination to access bank account information associated with the new user. In various embodiments, gathering data may include gather various types of data (e.g., tax data, financial data, public records data, economic data, local data, etc.) from various data sources as demonstrated above with respect to FIG. 2. The data gathered at step 530 may in many case be used to populate user data sets, such as user data sets 125 and/or user data sets 107 described above.

Various permissions may be associated with the gathered data. The game engine may receive an indication of these permissions from the new user. For instance, in one embodiment, the user may designate one or more trusted users that may have access to the new user's user data set. In some cases, the game engine may receive permissions from the new user that may be specific to certain portions of their data set. For instance, a user may wish to share contact information with one or more users but not financial information (e.g., information regarding salary, savings, investments, etc.) with the users. In various embodiments, these permissions may be set on a user-by-user basis. In other words, for a particular group of users, the new user may set different permissions for each member of the group. Note that in some embodiments, steps 510 and 540 may be combined.

As illustrated by block 550, the game engine may invite other players to participate with the new user, per the new user's request. In some cases, the game engine may invite other user's to share data with the new user. This may serve as a social activity as multiple users may observe financial activities of their "friends" (e.g., trusted users as defined by the set permissions). However, in many cases, the game engine (per the new user's request) may invite one or more other users to participate in a competition with the new user. In some cases, the terms of the competition (e.g., the competition metric described above) may be included in the competition invitation provided to one or more other users. In some embodiments, the user may request the game engine to invite one or more other users to participate in a financial competition, such as by sending the other users electronic notifications (e.g., via email, text message, or other notification). However, in some cases, the responsibility may fall on the user to perform this step of the method. For instance, the user may provide one or more other users (e.g., potential opponents) with a hyperlink (e.g., via email, text message, instant message etc.) to a web page or other resource configured to enable the other users to join the competition.

In one embodiment, the game engine may enable the new user to automatically select a pool of competitors with like characteristics. For example, the game engine may provide a user with a list of options, such as location (e.g., address or zip code), salary, lifestyle habits and/or spending habits, from which a user may select. For instance, if the user selects location, the game engine may choose competitors within proximity to the new user. In various embodiments, the users that the new user may select may be actual users, "virtual users" or a combination thereof. For instance, actual users may be any user that has "opted in" to participate in the game engine's services (e.g., such as described above regarding item 510). Additionally, virtual users may be fictitious users for which a user data set is maintained by the game engine. In some cases, the virtual users may be crafted by the game engine to have distinct characteristics, such as a "fiscally responsible" virtual user (e.g., a virtual user that adheres to sound personal finance principles) or a "big spender" virtual user (e.g., a virtual user who recklessly spends money on unnecessary items). In some embodiments, the new user may designate the types of virtual users with which he may compete. In other cases, these users may be pre-selected, such as by the game engine. In some embodiments, the game engine may be configured to match up competitors (e.g., competitors having similar financial backgrounds) that otherwise would not have chosen to compete.

After receiving appropriate responses from competition invitations, a competition amongst users may commence, as illustrated in block 560. Such competitions may include any of the various competitions described herein. In one example, the new user may compete against one or more other users to determine who can save the most amount of wealth during a particular time period. In another example, user may compete to determine which user's portfolio performed the best during a particular time period. In another example, users may compete to determine who will owe the least amount of taxes for a given tax year. In general, any finance related competition may be managed by the game engine and, more specifically, competition engine 101. Note that the various steps of FIG. 5 may in some embodiments be performed in a different order, modified, or omitted altogether.

Figure 6:
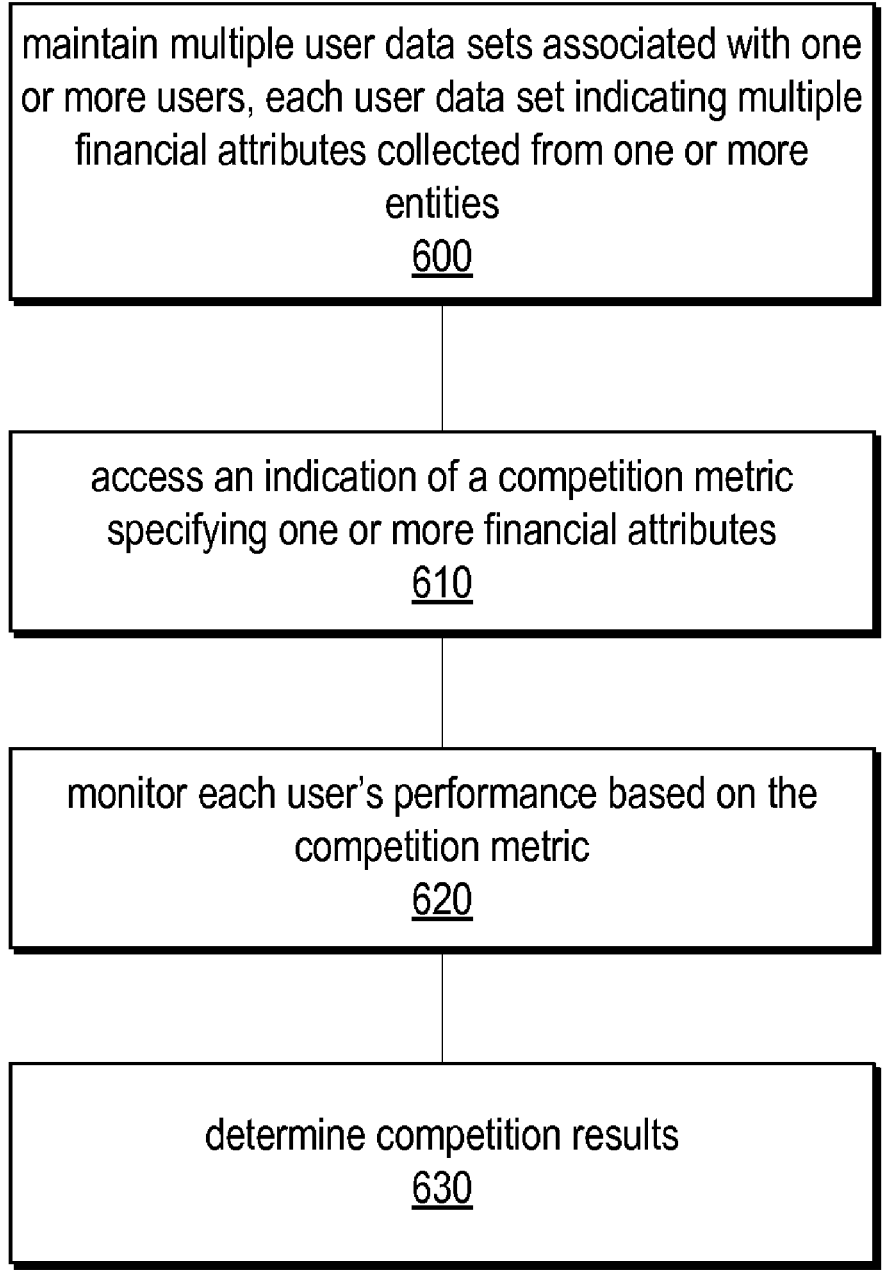
FIG. 6 illustrates an exemplary method for implementing a finance-based competition.

Various methods for performing and/or managing a competition between two or more users may be employed. One such method is the exemplary method illustrated by FIG. 6. The exemplary method of FIG. 6 may in various embodiments be implemented by game engine 100 described herein. As illustrated by block 600, the method may include maintaining multiple user data sets (e.g., user data sets 125 or user data sets 107) each associated with one or more users. Maintaining a user data set for a user may include maintaining a comprehensive set of financial attributes for the user. For instance, such attributes may indicate information about a user's salary, spending habits, investments, retirement strategies, assets, taxes, and other finance related attributes. The user data sets may also contain additional information that may affect the users finances, such as public records data (e.g., information about local property tax appraisals, crime rates, etc.), economic data (e.g., such as the economic indicators provided above with respect to item 160D), as well as local data (e.g., fuel prices near the users place of residence) or any other data described above with respect to FIG. 2.

As illustrated by block 610, the method may further include accessing a competition metric specifying one or more financial attributes associated. In various embodiments, the financial competition between the competing users may be based on one or more financial attributes. For instance, in one embodiment, a competition metric associated with a savings competition may indicate one or more user data set attributes that indicate how much money a user has saved during a particular time period. In another example, a competition metric associated with an investment competition may indicate one or more user attributes that indicate each user's investment rate of return for a given time period. Additionally, the granularity of such competition metrics may be varied. For instance, instead of indicating an attribute associated with all of a user's investments, the competition metric may indicate an attribute that is associated with only a user's equity investments or only a user's bond investments. In general, any attribute (or combination of attributes) may be specified by a competition metric for use in a user financial competition. In various embodiments, the competition metric may be specified by a user participating in the competition or, in some cases, chosen by a game engine, such as game engine 100.

As illustrated by block 620, for each user participating in the financial competition, the method may include monitoring the user's performance based on the competition metric. For instance, in one embodiment, a competition metric may be associated with a competition to determine which user may contribute a higher percentage of their income to a retirement account over a period of 1 month. As such, the competition metric may specify attributes associated with each user's income, retirement account, as well as a start and stop data for the competition. Accordingly, monitoring the user's performance based on the competition metric may include monitoring the user performance with respect to each attribute indicated by the competition metric. In some cases, monitoring a user's performance may include assigning a value (qualitative or quantitative) to the user's performance. In the example above, the method may include performing a calculation based on values indicated by the attributes specified by the competition metric. For instance, in the example above, determining a quantitative value for the user's performance may include performing the requisite calculations to determine a percentage value for a retirement contributions to total income ratio. For any particular competition, in some cases, the same method for monitoring a user's performance may be used for each user participating in the competition.

Figure 9:
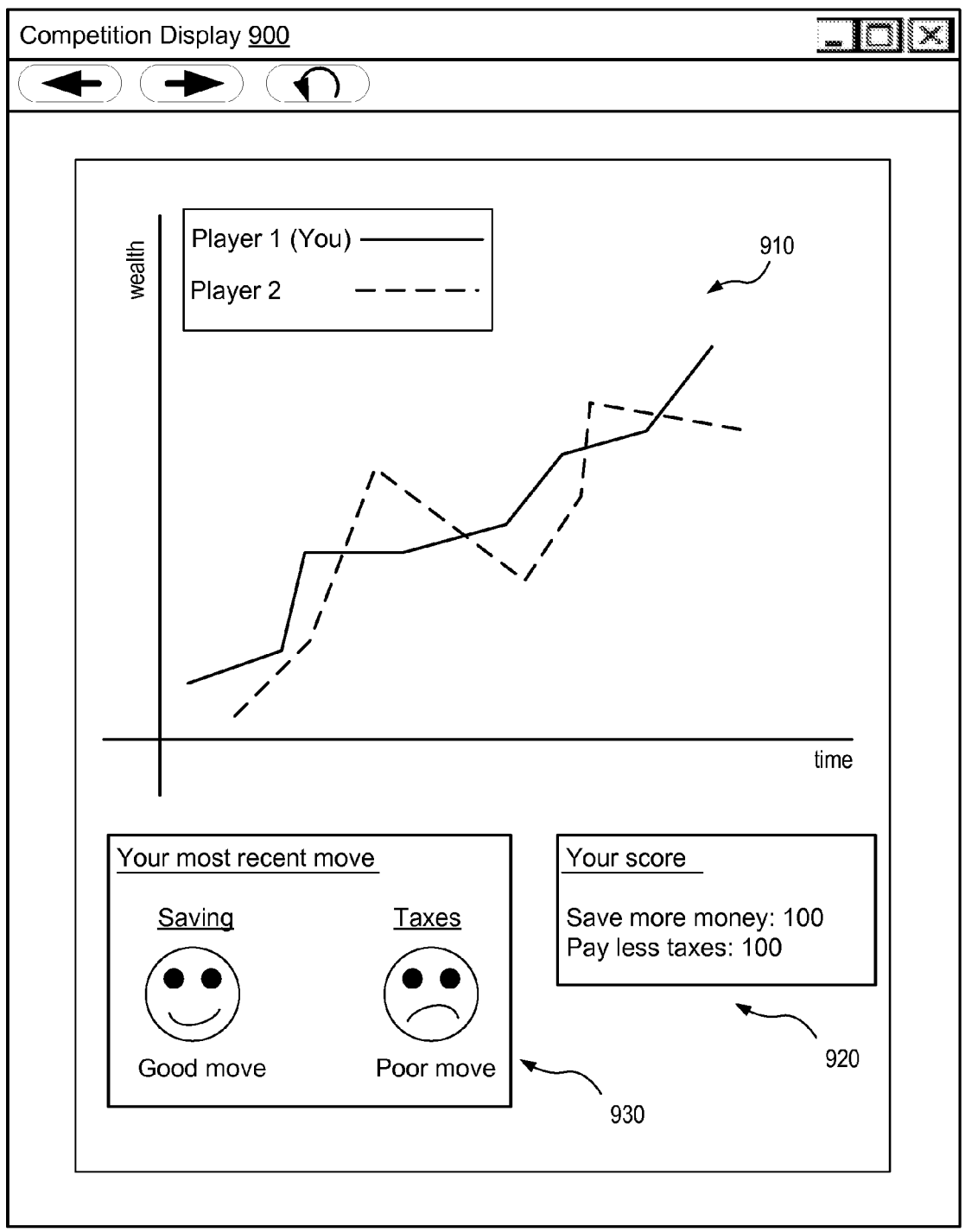
FIG. 9 illustrates an exemplary display for illustrating a financial competition between one or more users.

As illustrated by block 630, the method may include determine results for the competition. In some embodiments, this may include comparing each user's performance to determine which user has won the competition (by exhibiting a higher performance record). Additionally, in some embodiments, the results of the competition may be determine on a continual, real-time, periodic, aperiodic, or scheduled basis. For example, in some cases, the method may include generating a display to illustrate the performance of both users throughout the competition, such as illustrated in FIG. 9. In various embodiments, the method may include determining a leader at an intermediate state of the competition. In other words, the method may include determining a leader at various points throughout the competition. In some cases, the method may include declaring the winner to be the current leader at the conclusion of the competition. In various embodiments, determining results for the competition may also, or alternatively, include determining the relative performance of a particular user with respect to the performance of other users participating in the competition. In this case, the relative performance of the particular user may be dependent on both the user's performance and the performance of one or more other user's participating in the competition. In one embodiment, the winner of the competition may be the user that has the highest relative performance.

The system and method for finance-based competition may also include a method for enabling a user to compete against one or more user defined goals, such as the exemplary method of FIG. 7. In various embodiments, the method described herein may be implemented by game engine 100 and more specifically goal-based component 103. As illustrated by block 700, the method may include maintaining a user data set (e.g., user data sets 125 or 107) indicating multiple financial attributes for each of multiple users from one or more entities. In many embodiments, this step may be substantially similar to step 600 of FIG. 6.

The method may further include receiving one or more goal metrics as illustrated by block 710. In some cases, goal metrics may be provided by a user, while in other cases goal metrics may be provided by another entity or generated by a game engine, such as game engine 100. For instance, a user may create goal metrics that indicate goals that he would like to complete during a given time period, such as saving a certain amount of wealth (e.g., cash, equities, real estate, etc.), funding a child's education fund, purchasing a second home, minimizing taxes owed to a taxing authority, and other finance-related goals. In many cases, a goal metric may indicate additional information (e.g., meta-information) for a goal, such as a time by which the goal should be completed and/or other constraints.

For each goal metric, the method may include monitoring the users performance, as illustrated by block 720. For instance, a goal metric may indicate one or more attributes of a user data set that are associated with meeting a particular goal. For example, for a goal related to achieving a specified investment rate of return, the goal metric may indicate attributes of a user's user data set that relate to an account value at the user's investment brokerage(s). Accordingly, the method may include monitoring this specific account value to determine if the requisite rate of return is reached. The method may include determining whether the user has met one or more goals corresponding to each goal metric. In the example above, the method may include determining that investments in the user's brokerage account have appreciated by a certain percentage. If this percentage is higher than the requisite rate of investment return (as specified by the goal metric), the method may conclude that the goal associated with the goal metric has been met. If the percentage is lower than the requisite rate of investment return (as specified by the goal metric), the method may conclude that the goal associated with the goal metric has not been met.

The system and method for finance-based competition may also include a method for generating a financial prediction as illustrated by the exemplary method of FIG. 8. In various embodiments, the method described herein may be implemented by game engine 100 and/or rules engine 105. The method may include maintaining a user data set that includes multiple financial attributes about a user collected from one or more entities, as illustrated by block 800. This step may in various embodiments be substantially similar to steps 600 and 700 described above.

The method may also include accessing a request for a financial prediction that indicates one or more actions, as illustrated by block 810. This request may in some embodiments originate from a user (e.g., the users of FIG. 1). For instance, a user may desire to determine how a particular action (e.g., a hypothetical action) may affect their financial state (as indicated by their user data set). For example, a user may desire to determine the tax implications of purchasing a motorboat. Accordingly, the user may provide a request that provides details for such a purchase (e.g., total cost, specific details about the boat, sales tax, etc.). The method may also include accessing such a request and/or similar requests including, but not limited to, requests associated with purchases, investments, education funding, real estate, health related expenses, and other finance related items.

As illustrated by block 820, the method may further include determining one or more relevant rules, such as rules 109 described above. Relevant rules may differ from other rules in that they may directly apply to a particular financial prediction. In one embodiment, for each type of action indicated by the financial prediction request, there may exist one or more associated rules in a set of rules, such as rules 109. Accordingly, the method may include determining the one or more rules that correspond to each action indicated by the financial prediction request. Using the above example of purchasing a motorboat, there may exist one or more rules that correspond to such an action. For instance, in some cases, there may exist one or more rules for different types of boat purchases. For example, a boat that qualifies as a second home may have more favorable tax implications than a boat that does not qualify as a second home. In this example, there may exist separate rules for qualifying and non-qualifying boats. The method described herein may include determining the relevant rules that apply to the actions indicated by the request for a financial prediction.

After determining the relevant rules, the method may include applying the relevant rules to the actions indicated by the request and the user's user data set to generate a financial prediction. For instance, in the motorboat example above, the motorboat may qualify as a second home. Accordingly, applying the rules to the user's data set and the hypothetical action (e.g., purchasing a boat that qualifies as a second home) may yield a prediction that indicates the user's savings may reduce due to the cost of the boat. However, the prediction may also indicate that the user may deduct a portion or all of the final sale price of the boat due to favorable tax laws for items that qualify as second homes. Note that this is just one example of many predictions that may be yielded through the method of FIG. 8. Indeed, the method may include applying rules (e.g., rules 109) to a variety of user data sets and hypothetical actions.

The system and method for finance-based competition may include various displays for displaying a competition between two or more users. An exemplary competition display is illustrated by competition display 900 of FIG. 9. In various embodiments, a competition display may include a performance plot, such as performance plot 910. Performance plot 910 may illustrate the performance of two users, player 1 and player 2, which may be users of a game engine, such as the users illustrated in FIG. 1. In the illustrated embodiment, each users may be competing to determine who can save the most wealth within a given time period. While wealth may be a component of the competition metric in the illustrated embodiment, various other financial attributes may be used in other embodiments. In some embodiments, a quantitative score may be used to inform a user of their performance, as illustrated by quantitative display component 920. Quantitative display component 920 may in some embodiments provide a quantitative score for user-defined goals. For instance, in the illustrated embodiment, quantitative display component 920 provides quantitative values for a "saving money" goal as well as a "pay less taxes" goal. Additionally, competition display 900 may include an assessment of a user's latest actions or "moves" as illustrated by display component 930. In various embodiments, competition display 900 (or data defining such a display) may be generated by competition engine 101 of game engine 100.

Figure 10:
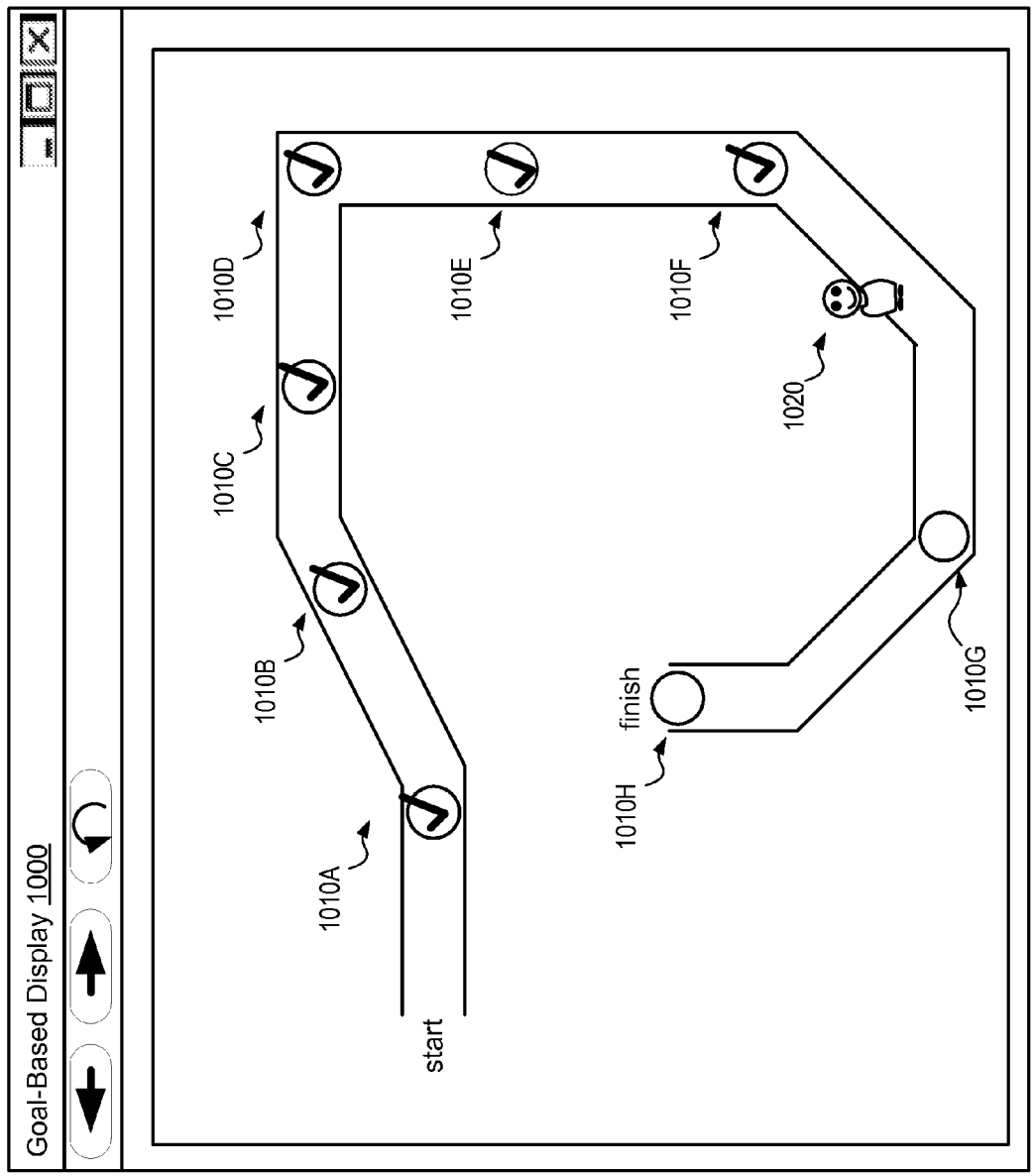
FIG. 10 illustrates an exemplary display for a managing multiple user-defined financial goals.

The system and method for finance-based competition may include various displays for illustrating the completion of goals by a user, such as the display of FIG. 10. For instance, as described above with respect to goal-based component 103, the game engine may enable a user to track their progress with respect to one or more user-defined goals in lieu of or in addition to the competitive aspects of game engine 100. In various embodiments goal-based component 103 may generate a goal-based display, such as goal-based display 1000. The goal-based display may graphically indicate one or more goals, such as goal icons 1010A-1010H. In the illustrated embodiment, the display indicates that goals associated with goal icons 1010A-1010F have been satisfactorily completed. Note that as described above with respect to goal-based component 103, the goals utilized may be defined by the user. In the illustrated embodiment, the goal-based display may also be configured to illustrate a user's progress with respect to their goals. For instance, user icon 1020 illustrates a user that has completed the goals associated with goal icons 1010A-1010F. User icon 1020 also indicates that the user has yet to complete goals associated with goal icons 1010G and 1010H. In various embodiments, each of goal icons 1010A-1010H may be associated with the various goals described herein, such as the goals described above with respect to goal-based component 103.

Exemplary System

Various embodiments of a system and method for finance-based competition, as described herein, may be executed on one or more computer systems, which may interact with various other devices. One such computer system is computer system 1100 illustrated by FIG. 11. Computer system 1100 may be capable of implementing a game engine as illustrated by game engine 100. Computer system 1100 may also be capable of storing user data sets and one or more rules, such as user data sets 107 and rules 109. In the illustrated embodiment, computer system 1100 includes one or more processors 1110 coupled to a system memory 1120 via an input/output (I/O) interface 1130. Computer system 1100 may further include a network interface 1140 coupled to I/O interface 1130, and one or more input/output devices 1150, such as cursor control device 1160, keyboard 1170, and display(s) 1180. In some cases, it is contemplated that embodiments may be implemented using a single instance of computer system 1100, while in other embodiments multiple such systems, or multiple nodes making up computer system 1100, may be configured to host different portions or instances of embodiments. For example, in one embodiment some elements may be implemented via one or more nodes of computer system 1100 that are distinct from those nodes implementing other elements.

In various embodiments, computer system 1100 may be a uniprocessor system including one processor 1110, or a multiprocessor system including several processors 1110 (e.g., two, four, eight, or another suitable number). Processors 1110 may be any suitable processor capable of executing instructions. For example, in various embodiments processors 1110 may be general-purpose or embedded processors implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA.

System memory 1120 may be configured to store program instructions 1122 and/or data 1132 accessible by processor 1110. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing a game engine, such as game engine 100 described above, are shown stored within system memory 1120 as game engine 100. In other embodiments, program instructions and/or data may be received, sent or stored upon different types of computer-accessible media or on similar media separate from system memory 1120 or computer system 1100. Generally speaking, a computer-accessible medium may include storage media or memory media such as magnetic or optical media, e.g., disk or CD/DVD-ROM coupled to computer system 1100 via I/O interface 1130. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1140.

In one embodiment, I/O interface 1130 may be configured to coordinate I/O traffic between processor 1110, system memory 1120, and any peripheral devices in the device, including network interface 1140 or other peripheral interfaces, such as input/output devices 1150. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices attached to a network (e.g., network 180), such as other computer systems (e.g., client computer systems), or between nodes of computer system 1100. In various embodiments, network interface 1140 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1150 may, in some embodiments, include one or more display terminals, keyboards, keypads, touchpads, scanning devices, voice or optical recognition devices, or any other devices suitable for entering or accessing data by one or more computer system 1100. Multiple input/output devices 1150 may be present in computer system 1100 or may be distributed on various nodes of computer system 1100. In some embodiments, similar input/output devices may be separate from computer system 1100 and may interact with one or more nodes of computer system 1100 through a wired or wireless connection, such as over network interface 1140.

Figure 11:
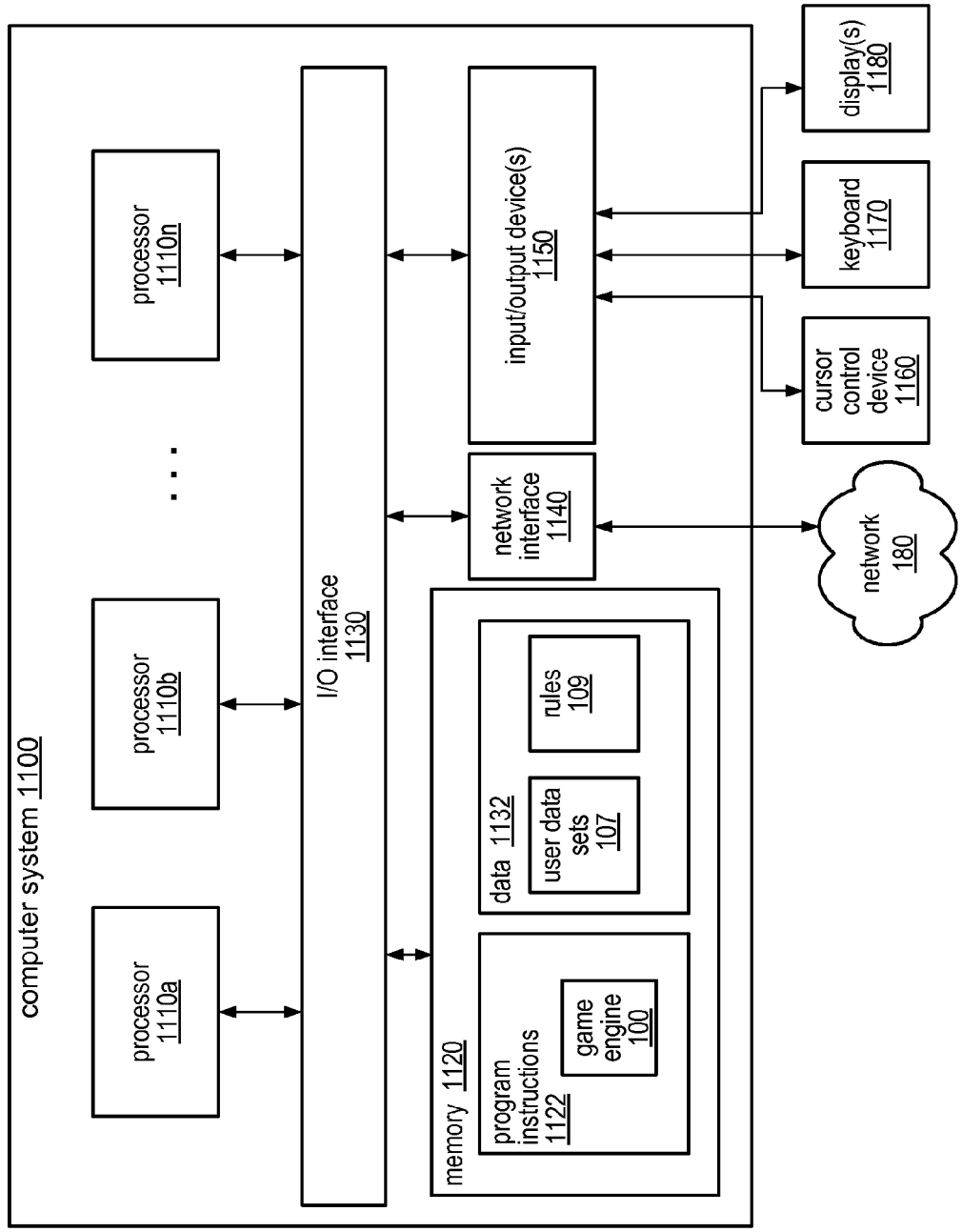
FIG. 11 illustrates a computing system suitable for implementing a game engine, according to one embodiment.

As shown in FIG. 11, memory 1120 may include program instructions 1122 configured to implement a game engine, such as game engine 100. Memory 1120 may also include data 1132 including various user data sets and rules, such as user data sets 107 and rules 109. In one embodiment, game engine 100 may be configured to implement the various methods described herein. In other embodiments, different elements and data may be included.

Those skilled in the art will appreciate that computer system 1100 is merely illustrative and is not intended to limit the scope of the present invention. In particular, the computer system and devices may include any combination of hardware or software that can perform the indicated functions, including computers, network devices, Internet appliances, PDAs, wireless phones, pagers, etc. Computer system 1100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1100 may be transmitted to computer system 1100 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The methods may be implemented in software, hardware, or a combination thereof, in different embodiments. In addition, the order of method(s) may be changed, and various elements may be added, reordered, combined, omitted, modified, etc. Various modifications and changes may be made as would be obvious to a person skilled in the art having the benefit of this disclosure.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A system, comprising:

a processor;

a memory coupled to the processor, wherein the memory comprises program instructions executable by the processor to:

provide a plurality of user data sets each associated with a particular user of a plurality of users, wherein each user data set comprises a plurality of financial attributes determined from data collected from one or more entities;

access information from an active bank account owned by the particular user to populate the particular user's data set of the plurality of user data sets, wherein the active bank account is held at an entity of the one or more entities, wherein the entity is a bank; and enable the particular user to engage in a finance-based competition with one or more other users of said plurality of users, wherein to enable the particular user to engage in the finance-based competition the program instructions are further executable to:

access an indication of a competition metric that specifies one or more of said plurality of financial attributes;

for each user participating in the finance-based competition, determine performance with respect to the one or more financial attributes specified by the competition metric; and determine relative performance associated with the particular user, wherein said relative performance is dependent on the particular user's performance and performance of one or more other users participating in the finance-based competition, wherein the particular user's performance is determined with respect to the one or more financial attributes based on the information accessed from the active bank account owned by the particular user.

2. The system of claim 1, wherein the program instructions are further executable to generate a tax return for said particular user from the plurality of financial attributes of the data set associated with said particular user.

3. The system of claim 1, wherein the program instructions are further executable to perform an update to each user data set with additional data from said one or more of entities.

4. The system of claim 3, wherein the program instructions are further executable to, subsequent to said update:

for each user participating in finance based competition, determine new performance with respect to said financial attributes indicated by the competition metric, wherein the new performance is based on the updated user data sets; and determine new relative performance associated with the particular user based on the updated user data sets, wherein said new relative performance is dependent on the particular user's new performance and the new performance of one or more other users participating in the finance-based competition.

5. The system of claim 1, wherein the program instructions are further configured to determine a leader of said finance-based competition, wherein to determine a leader the program instructions are configured to determine one of said plurality of users having a highest performance with respect to said financial attributes indicated by the competition metric.

6. The system of claim 1, wherein the program instructions are configured to generate and maintain one or more simulated virtual users to participate in said finance-based competition, wherein said plurality of users comprises said one or more simulated virtual users.

7. The system of claim 1, wherein the program instructions are configured to generate one or more financial predictions for said particular user, wherein said one or more financial predictions are dependent on one or more hypothetical actions indicated by said particular user.

8. A method, comprising:

providing a plurality of user data sets each associated with a particular user of a plurality of users, wherein each user data set comprises a plurality of financial attributes determined from data collected from one or more entities;

accessing information from an active bank account owned by the particular user to populate the particular user's data set of the plurality of user data sets, wherein the active bank account is held at an entity of the one or more entities, wherein the entity is a bank; and enabling the particular user to engage in a finance-based competition with one or more other users of said plurality of users, wherein said enabling comprises:

accessing, using a processor of a computer, an indication of a competition metric that specifies one or more of said financial attributes;

for each user participating in the finance-based competition, determining, using the processor, performance with respect to the one or more financial attributes specified by the competition metric; and determining, using the processor, relative performance associated with the particular user, wherein said relative performance is dependent on the particular user's performance and performance of one or more other users participating in the finance-based competition, wherein the particular user's performance is determined with respect to the one or more financial attributes based on the information accessed from the active bank account owned by the particular user.

9. The method of claim 8, further comprising generating a tax return for said particular user from the plurality of financial attributes of the data set associated with said particular user.

10. The method of claim 8, further comprising performing an update to each user data set with additional data from said one or more of entities.

11. The method of claim 10, further comprising, subsequent to said update:

for each user participating in finance based competition, determining new performance with respect to said financial attributes indicated by the competition metric, wherein the new performance is based on the updated user data sets; and determining new relative performance associated with the particular user based on the updated user data sets, wherein said new relative performance is dependent on the particular user's new performance and the new performance of one or more other users participating in the finance-based competition.

12. The method of claim 8, further comprising determining a leader of said finance-based competition, wherein determining a leader comprises determining one of said plurality of users having a highest performance with respect to said financial attributes indicated by the competition metric.

13. The method of claim 8, further comprising generating and maintaining one or more simulated virtual users to participate in said finance-based competition, wherein said plurality of users comprises said one or more simulated virtual users.

14. A computer-readable storage medium, comprising program instructions computer-executable to implement:

providing a plurality of user data sets each associated with a particular user of a plurality of users, wherein each user data set indicates a plurality of financial attributes determined from data collected from one or more entities;

accessing information from an active bank account owned by the particular user to populate the particular user's data set of the plurality of user data sets, wherein the active bank account is held at an entity of the one or more entities, wherein the entity is a bank; and enabling the particular user to engage in a finance-based competition with one or more other users of said plurality of users, wherein said enabling comprises:

accessing an indication of a competition metric that specifies one or more of said plurality of financial attributes;

for each user participating in the finance-based competition, determining performance with respect to the one or more financial attributes specified by the competition metric; and determining relative performance associated with the particular user, wherein said relative performance is dependent on the particular user's performance and performance of one or more other users participating in the finance-based competition, wherein the particular user's performance is determined with respect to the one or more financial attributes based on the information accessed from the active bank account owned by the particular user.

15. The medium of claim 14, wherein the program instruction are further executable to generate a tax return for said particular user from the plurality of financial attributes of the data set associated with said particular user.

16. The medium of claim 14, wherein the program instruction are further executable to perform an update to each user data set with additional data from said one or more of entities.

17. The medium of claim 16, wherein the program instruction are further executable to, subsequent to said update:

for each user participating in finance based competition, determine new performance with respect to said financial attributes indicated by the competition metric, wherein the new performance is based on the updated user data sets; and determine new relative performance associated with the particular user based on the updated user data sets, wherein said new relative performance is dependent on the particular user's new performance and the new performance of one or more other users participating in the finance-based competition.

18. The medium of claim 14, wherein the program instruction are further executable to determine a leader of said finance-based competition, wherein determining a leader comprises determining one of said plurality of users having a highest performance with respect to said financial attributes indicated by the competition metric.

19. The medium of claim 14, wherein the program instruction are further executable to generate and maintain one or more simulated virtual users to participate in said finance-based competition, wherein said plurality of users comprises said one or more simulated virtual users.

\* \* \* \* \*